United States Patent

[11] 3,601,712

[72] Inventor Shmuel Elazar
Camarillo, Calif.
[21] Appl. No. 812,500
[22] Filed Dec. 17, 1968
[45] Patented Aug. 24, 1971
[73] Assignee Bell & Howell Company
Chicago, Ill.
Continuation of application Ser. No. 387,059, Aug. 3, 1964, now abandoned.

[54] SOURCE FOLLOWER
10 Claims, 5 Drawing Figs.

[52] U.S. Cl. .......... 330/24, 330/32, 330/38, 307/304
[51] Int. Cl. .......... H03f 3/04
[50] Field of Search .......... 330/19, 22, 24, 25, 26, 38 FE, 38; 307/279, 304

[56] References Cited
UNITED STATES PATENTS
3,300,585 1/1967 Reedyk et al. .......... 330/38 X

*Primary Examiner*—Roy Lake
*Assistant Examiner*—Lawrence J. Dahl
*Attorney*—Christie, Parker & Hale

ABSTRACT: An impedance-matching circuit utilizing a field-effect transistor connected to a solid-state amplifying device. A resistive feedback path is provided from the output of the amplifying device to the input of the field-effect transistor and its value, together with the value of the biasing resistors, are chosen such that the input impedance to the circuit is determined almost entirely by the input impedance of the field-effect transistor. The value of these resistors are also selected such that the gain of the circuit is held at a value of slightly less than 1.0.

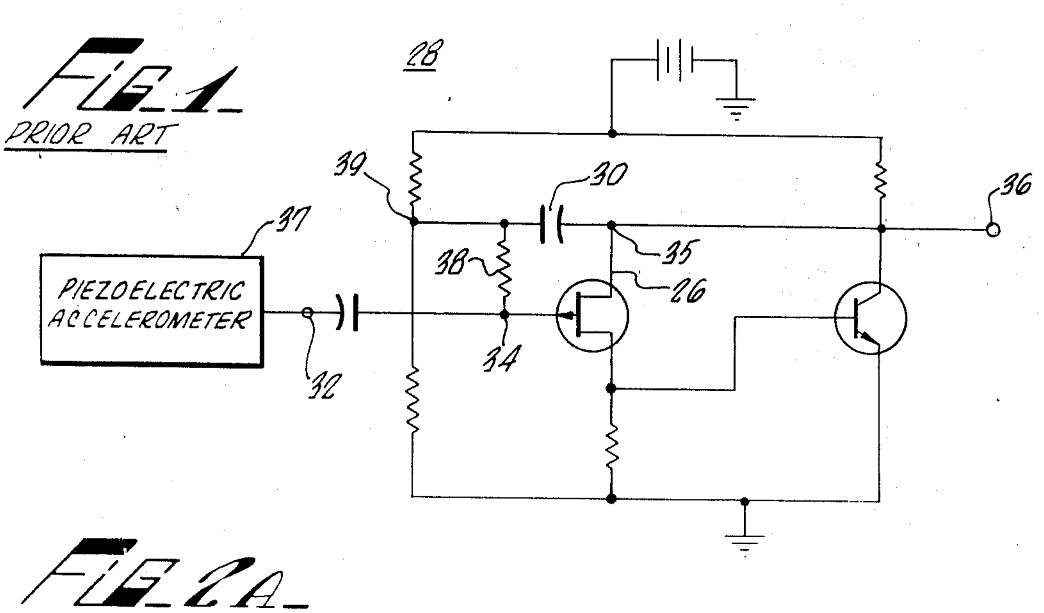
FIG. 1 PRIOR ART
FIG. 2A
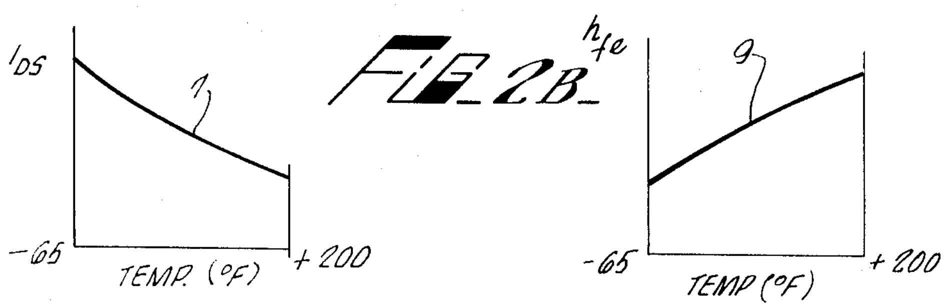
FIG. 2A, FIG. 2B
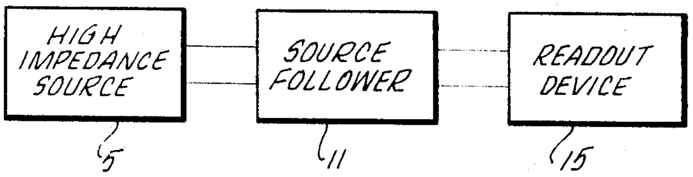
FIG. 3
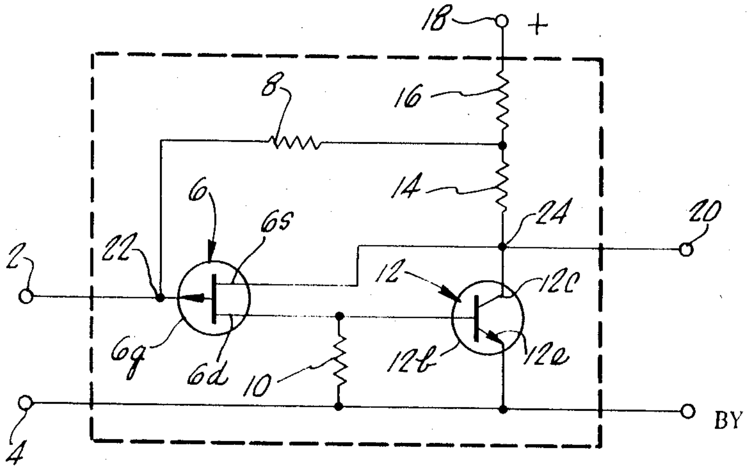
FIG. 4
INVENTOR.
SHMUEL ELAZAR
BY
Christie, Parker & Hale
ATTORNEYS

SOURCE FOLLOWER

CROSS REFERENCE TO RELATED APPLICATION

This application is a continuation of application Ser. No. 387,059, filed Aug. 3, 1964, now abandoned.

BACKGROUND OF THE INVENTION

This invention relates to impedance-matching devices and in particular to solid-state amplifiers characterized by a high input impedance, a low output impedance and extremely small size.

In the past, devices for matching high impedance sources with low impedance recorders, telemetering equipment and readout devices have been electron tube devices such as cathode followers and in the solid state art, devices such as emitter followers and source followers. All of these circuits are marked by characteristics which are undesirable when space, weight, reliability, severe environment and power considerations are important. With respect to cathode followers, size is an important drawback because the smallest cathode followers are many times larger than transistorized devices. In addition, their power requirements are substantially higher. In comparison to solid-state devices, their ability to withstand severe environmental conditions is limited.

Insofar as prior art solid-state devices are concerned, whether of the emitter follower variety or not, these have been characterized by the use of a capacitive feedback path, the so-called "bootstrapping" technique in order to achieve high impedance. The need for one or more capacitors in a feedback path imposes several limitations similar to those characteristic of cathode followers. In the first instance the size of the device is limited since the size of the capacitors cannot be reduced beyond a certain limit. Capacitors are also temperature sensitive devices and their low frequency response is limited because of some low frequency the feedback is no longer effective. In addition, circuits using capacitors in this function are sensitive to overloading signals. Thus, when a capacitor is used as a feedback element, a high input signal causes the circuit to oscillate or ring. Such oscillations are damped and will die out over a period but in the meantime the output of the device will be effected.

SUMMARY OF THE INVENTION

In contrast, the present invention provides a solid-state amplifier with extremely high input impedance, essentially unlimited low frequency response down to DC signals and extremely small size and weight.

The present invention is a source follower having no discrete capacitive elements comprising an input terminal, a first stage including a solid-state field effect device having an input and an output electrode and a resistive positive feedback path from the output electrode to the input electrode. A second stage is connected to the first stage, the second state including a solid-state device for amplifying a signal received from the first stage to a predetermined level when a signal is applied to the source follower input terminal. In addition, there is provided means for biasing the field effect device and the amplifying device to maintain the voltage gain of the source follower at a value slightly less than unity, an output terminal, and means for coupling the two stages to the input and output terminals whereby the input impedance to the source follower in maintained in excess of 100 megohms.

The amplifying device, e.g., a junction transistor is selected and biased in such a way that the predetermined level to which the output of the field effect transistor is amplified is only slightly less than the level of the signal presented to the input of the field effect transistor. This has the effect of causing the biasing circuit of the field effect transistor to look essentially like an open circuit to input signals and hence the input impedance to the circuit is determined almost exclusively by the input impedance of the filed effect transistor. Furthermore, the biasing of the field effect transistor is chosen in such a way that its temperature characteristic complements that of the junction transistor so that in the range from −320° F to +300° F a change in temperature has essentially no effect on the performance of the circuit.

The advantages of such a circuit are severalfold, but the primary advantage is that this circuit eliminates the need for a "-bootstrapping" or feedback capacitor in order to achieve high input impedance. By eliminating the capacitor, the size of the circuit can be substantially reduced. Furthermore, the low frequency response is substantially improved because it is no longer limited by a capacitor in the input circuit. Hence this circuit preserves its high impedance to input signals essentially down to the DC level. Elimination of the capacitor also eliminates the oscillation or ringing effect should the circuit be subjected to overloading. High reliability is achieved since the entire circuit requires only two transistors and four resistors. Furthermore, the circuit of this invention is characterized by an extremely low noise rating and a power consumption of less than 2 milliamperes at 22 volts. Finally, since the temperature characteristic of a field effect transistor can be adjusted by adjusting its bias, the overall circuit temperature characteristic can thereby be arranged such that temperature effects as far as the performance of the junction transistor is concerned are offset by reverse effects on the field effect transistor. The result is a stable operation throughout the rated temperature range.

BRIEF DESCRIPTION OF DRAWING

These and other features in the invention will be made more apparent by reference to the following figures in which:

FIG. 1 is a schematic circuit diagram of a prior art source follower utilizing a feedback capacitor to achieve high input impedance;

FIG. 2A is a graphical illustration of the variation in performance of the field effect transistor with temperature;

FIG. 2B is a graphical illustration of the variation in performance of a junction transistor with change in temperature;

FIG. 3 is a block diagram illustrating the use of a source follower in a typical impedance-matching function; and FIG. 4 is a schematic circuit diagram of a source follower embodying the invention.

DESCRIPTION OF A SPECIFIC EMBODIMENT

Referring to FIG. 1, there is depicted in schematic form a two state circuit diagram of a transistorized device 28 used for providing an impedance-matching circuit with such high impedance devices as piezoelectric accelerometers. The first stage utilizes a field effect transistor having gate, drain, and source electrodes. This circuit is designated a source follower since the output is connected directly to the source electrode at output terminal 36 and follows the signal generated by the piezoelectric source 37 and presented to the source follower at the input terminal 32. In order to achieve a high impedance necessary for matching the high impedance of the source 37 to succeeding circuit components such as telemetering equipment, the circuit uses a capacitor 30 to connect the junction 35 of the output terminal 36 and the source electrode 26 to the input terminal-gate electrode junction 34 through resistor 38. The effect of the capacitor 30 is to pass alternating signals at the source electrode 26 back to the junction 39 and hence the potential at this junction follows the potential at junction 35, thus making the circuit between junctions 34, 35 and 39 through resistor 38 and capacitor 30 appear to be an open circuit. The disadvantages of such a configuration are severalfold, as heretofore indicated, and are all due to limitations inherent in the use of a capacitor used in this so-called "bootstrapping" circuit.

The block diagram of FIG. 3 depicts the typical circuit relationship of the source follower. A high-impedance source 5 such as piezoelectric transducer is connected to the input of a source follower 11. To the output of the source follower 11 is connected a readout device such as a vacuum tube voltmeter or oscilloscope. By virtue of its high input impedance and low output impedance the source follower 11 is an excellent component for providing the necessary match between capacitive devices such as piezoelectric transducers and low input impedance readout equipment.

Referring now to FIG. 4, an input terminal 2 is connected to a gate electrode 6*g* of a field effect transistor 6. A field effect transistor, or as it is also referred to, a unipolar transistor, differs from the junction transistor in that it has only one junction of N- and P-type materials of interest and is a voltage-controlled device. This transistor may have a channel of P-type material and includes source, gate and drain electrodes designated by the subscripts *s*, *g*, and *d*, respectively. A common terminal is provided and when signals are applied to this circuit they are applied between this terminal and the input terminal 2. As shown, the common terminal 4 is connected to a biasing resistor and the emitter of a junction transistor. This is only one way in which the circuit can be arranged. It works equally well without any other rearrangements when terminal 18 is made the common terminal and the input signal is applied between this terminal and terminal 2. Connected to the gate electrode 6*g* is a biasing resistor 8 which is connected through a voltage-dropping resistor 16 to a source of positive-energizing potential connected to terminal 18. Connected between the junction of the resistor 8 and the voltage dropping resistor 16 is a biasing resistor 14 which is connected at its other terminal to the source electrode 6*s* of the field effect transistor. Resistor 14 is also connected to the collector electrode 12*c* of a junction transistor 12.

The junction transistor may be of the NPN variety and it includes emitter, base and collector electrodes designated by the subscripts *e*, *b*, and *c*, respectively. The drain electrode 6*d* of the field effect transistor is connected to the base electrode 12*b* of the junction transistor 12. A biasing resistor 10 is connected between the junction of electrodes 6*d* and 12*b* and the common terminal 4. The source electrode 6*s* is connected to the collector electrode 12*c* and the junction of these two electrodes in connected to an output terminal 20. The output signal from this circuit, when a signal is coupled between terminals 2 and 4, is obtained between output terminal 20 and common terminal 4. The circuit is completed by connecting the emitter electrode 12*e* to the junction of the biasing resistor 10 and the common terminal 4. By suitable arrangement of battery potential the transistors can be replaced by their counterparts i.e., the field effect transistor by one with an N-type channel and the junction transistor by one of the PNP variety.

Since the specific circuit design will depend on the particular application in which the circuit is to be used the following circuit specifications are provided by way of illustration only:

| | | |
|---|---|---|
| Transistor | 6 | Type SU127 manufactured by Siliconix, Inc. |
| Transistor | 12 | Type 2N2524 manufactured by the Sperry Semiconductor Division of Sperry Rand Corporation. |
| Resistor | 8 | 44,000,000 ohms. |
| Resistor | 10 | To be selected such that the voltage between terminals 20 and 4 is 11.5 volts ±0.5 volts when the supply voltage 18 is 20 volts and input capacitance of the circuit is 500 picofarads, typically the value of this resistance is 3,000 ohms. |
| Resistor | 14 | 237 ohms. |
| Resistor | 16 | 5,100 ohms. |

In operation, the NP junction of the field effect transistor 6 is reversed biased by biasing resistors 8 and 14. At the same time the junction transistor 12, which is connected in a common emitter configuration, has its emitter-base junction forward biased by the drain current of the field effect transistor.

When a positive input signal is applied to the terminal 2 the reverse bias of the field effect transistor is increased thereby decreasing conduction through it. As conduction through the transistor 6 decreases the voltage at the source electrode 6*s* increases. Since conduction through the field effect transistor 6 has been decreased the voltage drop across biasing resistor 10 likewise decreases, thus reducing the forward bias of the junction transistor 12. By causing the base electrode 12*b* to become less positive, conduction of the junction transistor 12 is decreased thereby increasing the voltage at the collector electrode 12*c*. Thus the output signals from the source electrode 6*s* and the collector electrode 12*c* respectively, are in phase and the effect of the junction transistor 12 is to amplify the output of the field effect transistor 6.

Under ordinary conditions the voltage gain of the source follower can be represented by the relation:

$$A_v = e_o/e_i = g_m h'_{fe} f R_s / 1 - h'_{fe} R_s \ldots$$

where $A_v$ is the voltage gain of the source follower, $e_o$ is the output voltage at terminal 20, $e_i$ is the input voltage terminal 2, $g_m$ is the transconductance of the field effect transistor, $h'_{fe}$ is the current amplification factor of the junction transistor stage and $R_s$ is the source resistance (resistor 16 in FIG. 4). Substituting values corresponding to the preceding circuit specification it can be shown that $A_v$ is approximately 0.99. This near-unity gain figure is the key to the high input impedance obtainable with this circuit. By adjusting the gain of the overall circuit such that its gain is only slightly less than 1.0 there results an output signal from the field effect transistor nearly identical in magnitude and phase with the input signal. Thus, the voltage at the junction 24 follows that at junction 22 and is very nearly identical to it. Therefore, with respect to time varying input signals, the electrical circuit between junctions 22 and 24, that is, the circuit through biasing resistors 8 and 14, has very little current flowing through it and hence the path looks open.

More precisely the circuit input resistance is determined according to the approximate relationship:

$$R_{\text{in}} = \frac{1}{(1-A_{\text{v}})\left(\frac{1}{R_{\text{g}}}+\frac{1}{r_{\text{gs}}}\right)+\frac{1}{r_{\text{gd}}}}$$

where $R_{in}$ is the input resistance of the source follower, $A_v$ is the voltage gain of the source follower, $R_g$ is the gate resistance (resistor 8 in FIG. 4), and $r_{gs}$ and $r_{gd}$ are the gate to drain and gate to source resistances respectively of the field effect transistor. Again by substituting values corresponding to the preceding circuit specification the input resistance can be shown to have a value on the order of 2500 to 3000 megohms. In production models of the source follower it has been found that the value of this input resistance is nominally 600 megohms. and throughout the temperature range in which the circuit is designed to operate, the input resistance is never less than 200 megohms. Thus, the circuit of this invention provides a high input impedance without the necessity of feedback capacitors and "bootstrapping" techniques.

The low output impedance of the source follower is also an important facet of the total effect of the source follower as an impedance matching device. In addition to matching the low input impedance of monitoring test instruments, the low output impedance of the source follower means that it is possible to obtain a relatively high maximum output signal for driving recording instruments over relatively long lengths of connecting cable. The output resistance of the circuit is approximately:

$$R_{\text{out}} = \frac{R_{\text{s}}}{1+(R_{\text{s}})(g_{\text{m}})(h'fe)}$$

where $R_{out}$ is the circuit output resistance and the other parameters are the same as indicated in the preceding discussion of the circuit voltage gain and input resistance. Substituting the proper values in this equation it can be shown that the output resistance is approximately 56.5 ohms. Production models correspond rather closely to the value, being on the order of 60 ohms.

It is a characteristic of field effect transistors that, by proper biasing, control of its temperature characteristic can be accomplished. This effect is taken advantage of in the circuit of this invention in such a way that the field effect transistor is biased to provide a temperature characteristic which complements the temperature characteristic of a junction transistor.

In FIGS. 2A and 2B the temperature characteristics of a field effect and a junction transistor, respectively, are depicted. In FIG. 2A the line 7 indicates the current flow between drain and source electrodes under a particular bias condition for temperatures in the range of −65° F to +200° F. Likewise line 9 in FIG. 2B indicates the change of $h_{fe}$ (also symbolized as $\beta$), the current amplification factor of the junction transistor, with temperature over the same range. By selecting the two transistors such that the field effect transistor can be biased to cause its reaction to temperature change to complement that of the junction transistor the overall circuit performance is rendered essentially insensitive to temperature over a specific range.

Thus, in operation, any temperature changes surrounding circuit produce essentially the opposite effect in the field effect transistor from that produced in the junction transistor, and hence, the two effects cancel each other. The temperature range for which this compensation can be achieved is determined by the operating temperature range of the individual transistors. For the particular field effect and junction transistors indicate in the preceding circuit specification this range has been found to be approximately 265° F., from −65° F. to +200° F. With higher quality transistors it is possible to extend this range to 620° F., from −320° F. to +300° F. Since the DC voltage level change with temperature is kept at a minimum, the maximum undistorted AC output signal remains high over the specified temperature range.

The source follower is primarily designed for use with piezoelectric transducers, devices which have an extremely high output impedance. Thus, in order to provide an impedance match between the output of such devices and readout equipment, an impedance matching circuit must be inserted in order to obtain a satisfactory power transfer. The source follower of this invention is an ideal solution to the problem since its extremely small size means that it can be made an integral part of the transducer. In addition to uses in this particular application, the source follower may also be used as a first stage of a high impedance amplifier; as a first stage of a charge amplifier; as an input state of an operational amplifier such as an integrator, a differentiator or a multiplier; as means for converting an accelerometer transducer into a velocity transducer or a displacement transducer; and finally, for use in medical electronic equipment for such application as measuring nerve potentials.

What is claimed is:

1. A source follower having no discrete capacitive elements comprising:

an input terminal;

a first stage including a solid-state field effect device having an input, an output, and a biasing electrode and a resistive positive feedback path from the output electrode to the input electrode;

a second stage connected to the first stage and including a solid-state device having an input and an output electrode for amplifying a signal received from the first stage to a predetermined level when a signal is applied to the source follower input terminal, the input electrode of the solid-state device being connected to the biasing electrode of the field effect device;

first biasing means connected to the junction of the biasing electrode of the field effect device and the input electrode of the solid-state device;

second biasing means connected to the resistive positive feedback path in a voltage-dividing relationship therewith, the impedance of the biasing means and feedback path being chosen such that the voltage gain of the source follower is maintained at a value slightly less than unity;

an output terminal; and means for coupling the two stages to the input and output terminals whereby the input impedance to the source follower is maintained in excess of 100 megohms.

2. A source follower comprising:

an input terminal;

a first stage having a field effect transistor including a gate, a source and a drain electrode, the gate electrode being connected to the input terminal, the first stage being provided with a single positive feedback path from the source electrode to the gate electrode;

a second stage having a junction transistor connected in a common emitter configuration including an emitter, a collector and a base electrode;

means connecting the drain electrode to the base electrode;

first biasing means connecting the junction of the drain and base electrodes to the emitter electrode;

means connecting the source electrode to the collector electrode;

second biasing means connected to the resistive positive feedback path in a voltage-dividing relationship therewith, the impedance of the feedback path and first and second biasing means being chosen such that the voltage gain of the source follower is maintained at a value slightly less than unity;

and output terminal; and means coupling the collector and source electrodes to the output terminal whereby the input impedance to the source follower is maintained in excess of 100 megohms.

3. A source follower comprising:

input, output and common terminals;

a field effect transistor including a gate, a source and a drain electrode, the gate electrode being connected to the input terminal, the source electrode being connected directly to the output terminal and by a single nonreactive connection to the gate electrode;

a source of potential;

first biasing means connected between the source of potential and the nonreactive connection in a voltage-dividing relationship therewith;

a junction transistor including an emitter, a collector and a base electrode, the base electrode being connected directly to the drain electrode, the collector electrode being connected directly to the source electrode, the emitter electrode being connected to the common terminal; and second biasing means connected between the base electrode and the common terminal, the transistor and the impedance of the nonreactive connection and first and second biasing means being chosen such that the effect of temperature change on the field effect transistor compensates for the effect of temperature change on the junction transistor.

4. A source follower comprising:

input, output and common terminals;

a field effect transistor including a gate, a source and a drain electrode, the gate electrode being connected to the input terminal, the source electrode being connected directly to the output terminal and by a single nonreactive connection to the gate electrode;

a source of energizing potention;

first biasing means connected between the common terminal and the nonreactive connection in a voltage-dividing relationship therewith;

a junction transistor including an emitter, a collector and a base electrode, the base electrode being connected directly to the drain electrode, the collector electrode being connected directly to the source electrode, the emitter electrode being connected to the source of energizing potential; and second biasing means connected between the junction of the drain and base electrodes and the source of energizing potential, the impedance of the nonreactive connection and the first and second biasing means being chosen such that the voltage gain of the source follower is maintained at a value slightly less than unity.

5. A source follower comprising:

input, output and common terminals;

a P-type channel field effect transistor including a gate, a source and a drain electrode, the gate electrode being connected to the input terminal, the source electrode being connected directly to the output terminal;

a source of potential;

first resistive means connected to the source of potential;

second resistive means connected to the first resistive means at the side thereof opposite the source of potential and the junction of the output terminal and source electrode;

third resistive means connected between the junction of the first and second resistive means and the gate electrode;

an NPN-type junction transistor including an emitter, a collector and a base electrode, the base electrode being connected directly to the drain electrode, the collector electrode being connected directly to the junction of the output terminal and the source electrode, the emitter electrode being connected to the common terminal; and forth resistive means connected between the base and drain electrode junction and the common terminal, the resistance of the first, second, third and forth resistive means being chosen such that the voltage gain of the source follower is maintained between 0.9 and 1.0.

6. A source follower according to claim 5 wherein the junction transistor is selected and biased such that the output of the field effect transistor is amplified to a predetermined level when a signal is applied across the input and common terminals and the junction transistor, the field effect transistor, the first, second and third resistive means are selected such that the effect of temperature change on the field effect transistor compensates for the effect of temperature change on the junction transistor.

7. A source follower comprising:

an input terminal;

a first stage including a field effect transistor having an input and an output electrode;

a second stage connected to the first stage, said second stage including a junction transistor having an input and an output electrode and being arranged so as to amplify a signal received from the first stage to a predetermined level when a signal is applied to the input terminal;

an output terminal from the source follower connected to the output electrode of the junction transistor, the output electrode of the field effect transistor being connected only to the junction common to the output terminal and junction transistor output electrode;

a positive feedback path from the junction common to the output terminal and the output electrodes of the field effect and junction transistors to the input electrode of the field effect transistor, said positive feedback path being the only feedback path provided between the output and input electrodes of the field effect transistor and being further characterized in that said path is solely resistive in nature;

means connecting the input terminal and the field effect transistor input electrode; and means for biasing the two transistors, the biasing means being chosen such that the gain at the field effect transistor output electrode is slightly less than unitary.

8. A source follower according to claim 7, in which the gain at the field effect transistor output electrode is maintained by the limits of 0.9 and 1.0.

9. A source follower according to claim 7, in which the biasing means are also chosen such that the effects of ambient temperature changes on the field effect transistor compensate for the effects of ambient temperature changes on the junction transistor in the range from approximately −320° F. to +300° F.

10. A source follower according to claim 7, in which the biasing means are also chosen such that the effects of ambient temperature changes on the field effect transistor compensate for the effects of ambient temperature changes on the junction transistor in the range from approximately −65° F. to +200° F.